DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 1, 1976

947 O.G. 14

T947,010

PROCESS FOR PARTIAL DELIQUEFACTION OF CELLULOSE TRIACETATE PELLETS

Frank M. Volberg, 4409 Chickasaw Road, and Joe M. Mullins, Rte. 8, 5605 Old Island Road, both of Kingsport, Tenn. 37664

Filed Mar. 3, 1975, Ser. No. 554,375
**Int. Cl. F26b *3/00***
U.S. Cl. 34—9
1 Sheet Drawing. 5 Pages Specification

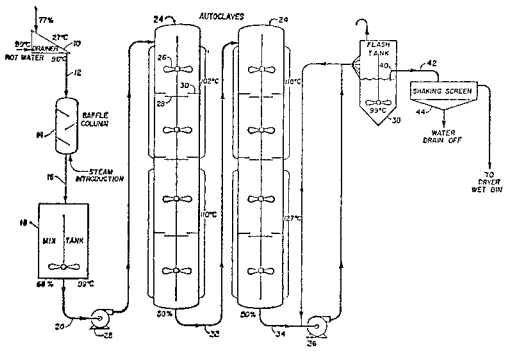

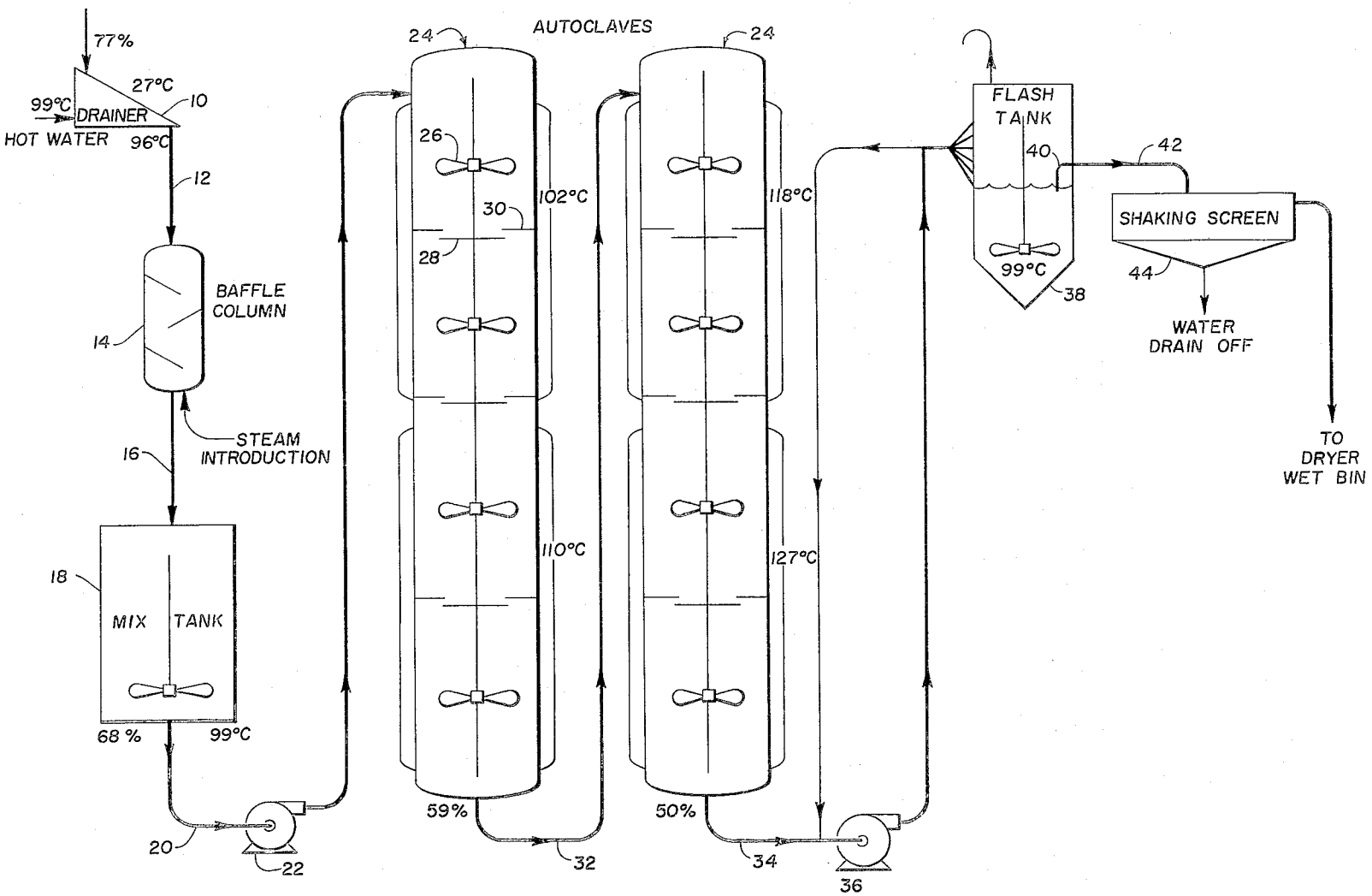

Process for partially dewatering cellulose triacetate pellets by which the pellets in a water slurry form are preheated to about 99° C., and then are heated by gradually being increased in temperature at the rate of no more than about 3° to 5° C. per minute until reaching the temperature of about 120° C. to 127° C. The steps of preheating and heating include contacting the pellets with hot water. The step of gradually heating the pellets is accomplished above atmospheric pressure at about 25 to 40 p.s.i.g. The pellets shrink and exude moisture as they are treated and go from a moisture content of about 77–78% to a final partially dewatered moisture content of about 50%, and then are free drained or gravity drained for subsequent drying PROCESS FOR PARTIAL DELIQUEFICATION OF CELLULOSE TRIACETATE PELLETS
Original Filed March 3, 1975